(12) United States Patent
Palen et al.

(10) Patent No.: US 6,205,266 B1
(45) Date of Patent: Mar. 20, 2001

(54) ACTIVE ALIGNMENT PHOTONICS ASSEMBLY

(75) Inventors: Edward J. Palen, Marina del Rey; Alan M. Hirschberg, Thousand Oaks, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/167,198

(22) Filed: Oct. 6, 1998

(51) Int. Cl.⁷ .................................................. G02B 6/42
(52) U.S. Cl. .................. 385/15; 385/50; 385/52; 385/88; 385/90; 385/93
(58) Field of Search ................... 385/15, 52, 90, 385/88, 97, 50, 49, 93

(56) References Cited

U.S. PATENT DOCUMENTS

| | | | |
|---|---|---|---|
| 3,959,729 | 5/1976 | Marchetti | 455/157.2 |
| 4,452,506 | * 6/1984 | Reeve et al. | 385/52 |
| 4,474,423 | * 10/1984 | Bisbee et al. | 385/52 |
| 4,696,062 | * 9/1987 | LaBudde | 389/159 |
| 4,746,195 | * 5/1988 | Auracher et al. | 385/52 |
| 5,039,191 | * 8/1991 | Myszka | 385/31 |
| 5,216,729 | 6/1993 | Berger | 385/31 |
| 5,343,548 | 8/1994 | Hall | 385/89 |
| 5,346,583 | 9/1994 | Basavanhally | 216/26 |
| 5,604,832 | 2/1997 | Hall | 385/89 |
| 5,623,337 | * 4/1997 | Iori et al. | 356/153 |
| 5,666,450 | * 9/1997 | Fujimura et al. | 385/93 |

OTHER PUBLICATIONS

Y. Oikawa, H. Kuwatsuka, T. Yamamoto, T. Ihara, H. Hamano and T. Minami, *Packaging Technology for a 10–Gb/s Photoreceiver Module*, Feb. 1994, pp. 343–352, Journal of Lightwave Technology, vol. 12, No. 2.

* cited by examiner

*Primary Examiner*—Hemang Sanghavi
*Assistant Examiner*—Sung Pak
(74) *Attorney, Agent, or Firm*—Michael S. Yastsko

(57) ABSTRACT

An active alignment photonics assembly actively couples optical energy between optical devices. An adjustable fiber or other optical carriers, carries an optical signal which is received at a detector where the power level of the optical signal is measured. Based on the power level measurement, the alignment of the fiber or other optical devices contained in the assembly are provided by an optical feed-back loop which controls the position of the fiber or other devices relative to the detector by use of microactuator mechanisms.

21 Claims, 3 Drawing Sheets

ACTIVE ALIGNMENT PHOTONICS ASSEMBLY

BACKGROUND OF THE INVENTION

1. Field of the Invention

The present invention relates generally to photonics assemblies, and more specifically to a monolithically integrated alignment photonics assembly for actively coupling optical energy between optical devices.

2. Description of the Prior Art

Compact and simple photonics systems are essential in optical communication applications. Photonics systems require high light transmission efficiencies in order to obtain low error rates. The transmission efficiency is measured as insertion loss for photonics applications and becomes more important for photonics systems working at high data transmission rates. The high data transmission (high bandwidth) rates require the use of single mode and polarization maintaining fiber optics where optical alignment from fiber to fiber, transmitter to fiber, transmitter to modulator, transmitter to multiplexer and fiber to receiver becomes critical to minimizing insertion loss. Optical alignment requirements for single mode fibers are at micron and sub-micron levels as opposed to supermicron levels for lower bandwidth multimode fibers. Optical alignment methods are near the limit of improvement using conventional alignment techniques. For example, single mode fiber connectors using actively aligned ferrules, like that described in the publication "Packaging Technology for a 10-Gb/a Photoreceiver Module", by Oikawa et al., Journal of Lightwave Technology Vol. 12 No. 2 pp.343–352, February 1994, are typically limited to 0.2 dB insertion loss. The Okiwawa publication discloses an optical coupling system, illustrated in FIG. 1, containing a slant-ended fiber 46 secured in a fiber ferrule 48 where the fiber ferrule 48 is welded to a side wall 50 of a flat package 52 and a microlens 54 is monolithically fabricated on a photodiode 56 where the photodiode 56 is flip-chip bonded to the flat package 52. An optical signal 58 enters horizontally and is reflected vertically at the fiber's 46 slant-edge. The microlens 54 then focuses the optical signal 58 on the photodiode's 56 photosensitive area.

As described in the Oikwawa publication, maintaining alignment between the fiber and the photodiode chip is essential for optimal coupling of the optical signal. Misalignment can occur as a result of mechanical stress to the fiber ferrule or thermal fluctuations of the entire system. In an attempt to overcome these factors, complex assembly and fabrication techniques are used. The fiber attachment is a complex ferrule attachment which seeks to optimize the mechanical strength of the attachment and therefore minimize the effects of fiber displacement. Finally, in order to provide a high optical coupling efficiency wide misalignment tolerances must be built in to the photodiode chip during fabrication to compensate for both displacement by the fiber attachment and deformation by temperature fluctuation.

Disclosed in U.S. Pat. No. 5,346,583 is an active alignment system for laser to fiber coupling, as illustrated in FIG. 2. The '583 patent attempts to minimize optical coupling losses by actively coupling optical energy between a source and a transmission medium. A laser 11 directs a beam 10 in the direction of a first mirror 13 and from the first mirror 13 the beam 10 is reflected to a second mirror 17 where the beam 10 is again reflected. The two mirrors are mounted on flexure elements and the flexure elements each have the capability to adjust the beam 10 in one dimension. The beam direction which is determined by the two mirrors 13 and 17 is focused by a lens 18 onto an input aperture for a waveguide contained within a modulator 20. The modulator 20 splits the beam 10 into two output beams. The two output beams are coupled at a lens 22 and focused onto a pair of fiberoptic fibers 43 and 44. Fibers 43 and 44 are each connected to electromechanical transducers 23 and 24 respectively, where the transducers have the ability to adjust the input ends of the fibers 43 and 44 in two dimensions. The active adjustment of both the mirrors (13 and 17) and the fibers (43 and 44) is accomplished by a controller 27. The controller 27 receives as input an indication of the amount of light passing through the fibers 43 and 44 from receivers 38 and 39 and supplies corrective feedback to the mirrors (13 and 17) and the fibers (43 and 44).

As discussed, present optical coupling systems use a variety of coupling schemes to obtain efficient coupling within photonics applications. However, many of these schemes use static components which are typically made of different materials and have different thermal expansion coefficients. These differences can cause optical misalignment during temperature changes, which are common in space applications. Photonics systems which are disclosed in the art and attempt to overcome misalignment problems by using active alignment control feedback techniques, typically use discrete bulk optical components and the complexity of the assembly process is increased. The greater the complexity the more assembly costs are increased and reliability decreased.

Based on techniques known in the art for photonics coupling schemes, a monolithic alignment assembly for active alignment of an optical fiber core to an optical device is highly desirable.

SUMMARY OF THE INVENTION

It is an aspect of the present invention to provide an active alignment photonics assembly. Briefly, the photonics assembly includes a fiber optic means for carrying an optical signal and, a first optical element spaced from the fiber optic means and having an input means for accepting the optical signal. Optionally, the photonics assembly may provide a second optical element having an optical coupling means, the second optical element being disposed in an optical signal path between the fiber optic means and the first optical element. To maintain the alignment of the photonics assembly, a sensing element is provided having a means for determining the power of the optical signal at the first optical element and producing a status signal in response thereto. A controller is provided having a means for receiving the status signal and distributing a correction signal and an adjusting means for receiving the correction signal and adjusting the path of the optical signal in response to the correction signal. The adjusting means comprises at least one servo-mechanism controlled microactuator capable of adjusting the fiber optic means, the second optical element, or both simultaneously.

It is also an aspect of the present invention to provide an active alignment photonics assembly. Briefly, the photonics assembly includes a fiber optic means for carrying an optical signal, a first optical element spaced from the fiber optic means and having an input means for accepting the optical signal. Optionally, the photonics assembly may provide a third optical element having an optical coupling means, the third optical element being disposed in an optical signal path between the fiber optic means and the first optical element. To maintain the alignment of the photonics assembly, a second optical element is provided spaced from the fiber optical means and having an input means for accepting the divergent power of the optical signal. Further, a sensing element is provided having a means for determining the divergent power of the optical signal at the second optical element and producing a status signal in response thereto. A controller is provided having a means for receiving the status signal and distributing a correction signal and an adjusting means for receiving the correction signal and adjusting the path of the optical signal in response to the correction signal. The adjusting means comprises at least one servo-mechanism controlled microactuator capable of adjusting the fiber optic means, the third optical element, or both simultaneously.

BRIEF DESCRIPTION OF THE DRAWINGS

Reference is now made to the following specification and attached drawings, wherein.

DETAILED DESCRIPTION OF THE INVENTION

Figure 1:
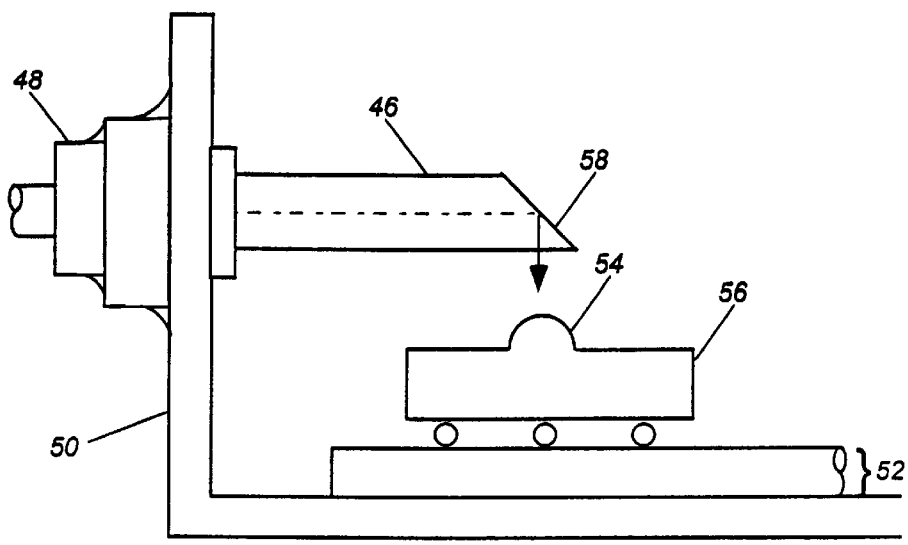
FIG. 1 is an illustration of a known optical coupling system which includes a mounted fiber assembly and a microlens monolithically integrated into a photodiode.
Figure 2:
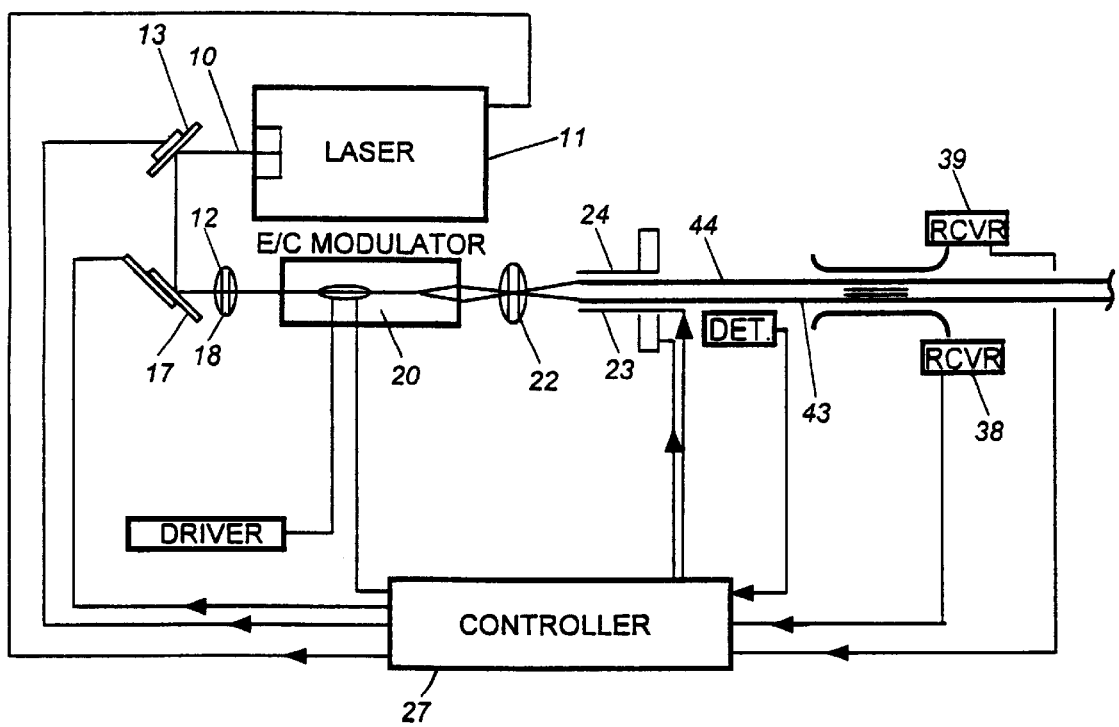
FIG. 2 is an illustration of another known optical coupling system which includes an active alignment system for laser to fiber coupling.
Figure 3:
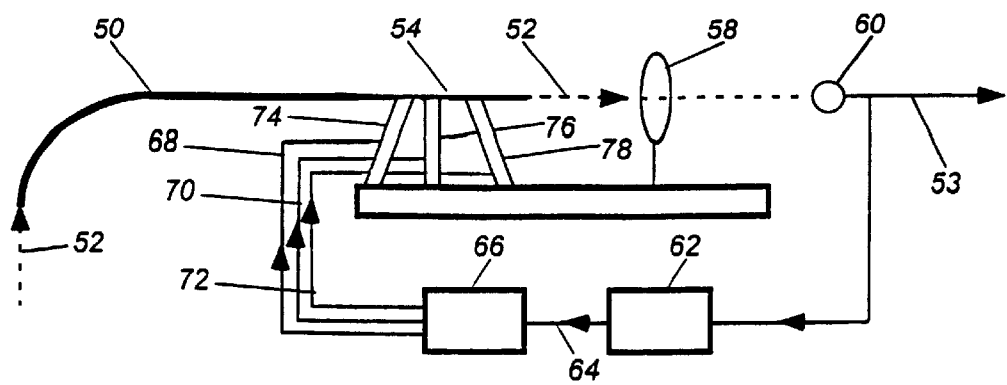
FIG. 3 is an illustration of a active alignment photonics assembly in accordance with the present invention.

The present invention relates to a photonics assembly and, more particularly, to a photonics assembly which provides for active alignment of an optical fiber core to a photodiode detector, an optical fiber, a modulator, a filter, a waveguide, or similar optical receiving device. The preferred embodiment of the present invention, as illustrated in FIG. 3, includes a jacketed fiber optic cable 50, a fiber core 54, a plurality of microactuators (74, 76, and 78), a lens 58, a photodetector 60, a sensing element 62, and a controller 66. The jacketed fiber optic cable 50 conducts an optical signal 52 through a fiber core 54. The fiber core 54 is a single mode fiber and is chosen for its ability to operate when modulated at high microwave frequencies (greater than 2 Ghz) and may include polarization maintaining capabilities. The fiber core 54 is mounted on a plurality of microactuators 74, 76, and 78 which are used to align the fiber core 54 and in order to provide optimal adjustment of the fiber core 54, the microactuators 74, 76, and 78 are oriented to allow adjustment of the fiber core 54 in three dimensions (x, y, and z). The microactuators 74, 76, and 78 adjust the fiber core 54 by a "flexing" motion and may be bimetallic strips which are thermally driven by resistance heating or piezoelectric materials which are electrical current driven and require low electrical power duties. In addition to the preferred bimetallic strips or piezoelectric materials, the microactuators 74, 76, and 78 may also include heated elements, electrical movable elements, bicompound strips, component strips or other materials providing similar "flexing" properties. Alternatively, the microactuators 74, 76, and 78 may be micro-mechanical devices such as micromachined motors, levers, or stepper motors. It is important to note that the selection of microactuators is not limited to those materials or devices which provide microsecond motion responses, but may also include those materials or devices which provide greater than I second response times.

A lens 58 receives the optical signal 52 and focuses any divergent optical energy of the optical signal 52 leaving the fiber core 54. Alternatively, the lens 58 may be excluded from the photonics assembly depending on the coupling requirements of the particular photonics application. The lens 58 may also be substituted for by a mirror, diffraction element, interference element, waveguide or similar optical device having optical coupling characteristics.

The optical signal 52 passes through the lens 58 and is focused onto a photodiode detector 60 which converts the optical signal 52 to an electrical signal 53. As previously described, the photodiode detector 60 may be a fiber, a modulator, a filter, or a waveguide (active or passive).

Figure 7:
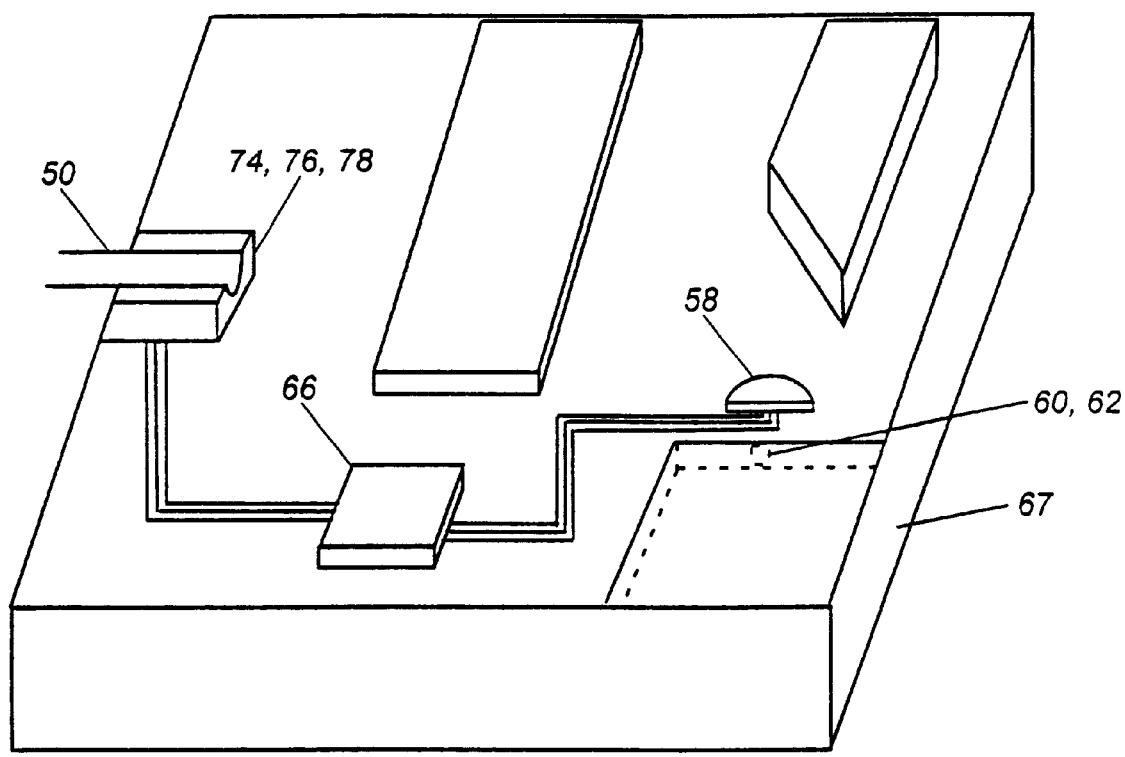
FIG. 7 is an illustration of an active alignment photonics assembly formed from a monolithic body in accordance with the present invention.

The photodiode detector 60 is electrically connected to a sensing element 62 which, by means of a current meter or similar device, is able to detect the power level and polarization generated by the optical signal 52. The power level of the signal 52 is compared against a predetermined level of power expected for optimal optical alignment of the fiber core 54 to the photodiode detector 60. Based on the results of the comparison an electrical status signal 64 is sent to a controller element 66 which actuates the flexing movement of a microactuator by transmitting separate electrical signals 68, 70, and 72 to microactuators 74, 76, and 78 respectively. The electrical signals 68, 70, and 72, cause the microactuators to "flex" or move in proportion to the strength and duration of the electrical signal and by the flexing action adjust the position of the fiber core 54. In the preferred embodiment and, as illustrated in FIG. 7, the microactuators (74, 76, and 78), lens 58, photodetector 60, sensing element 62, controller 66 and their respective alternate embodiments may be fabricated to form a monolithic body 67.

Figure 6:
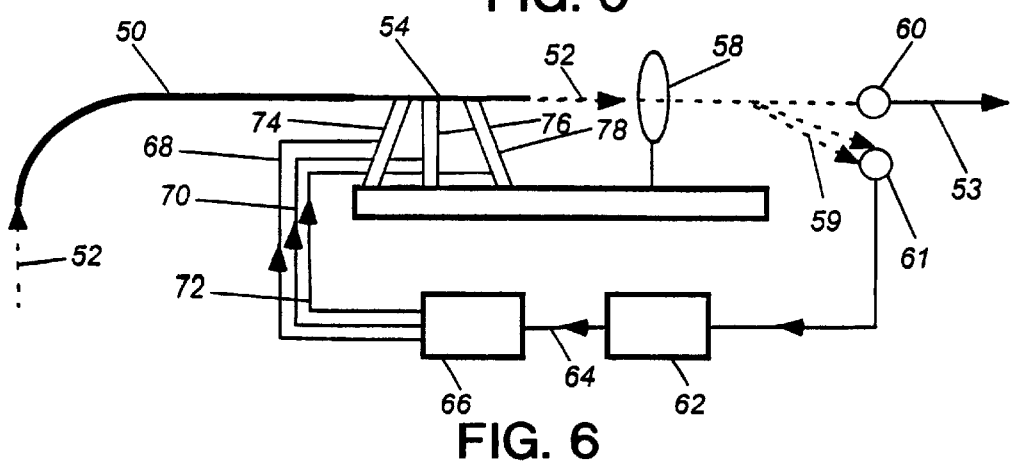
FIG. 6 is an illustration of a further alternate embodiment of the active alignment photonics assembly in accordance with the present invention.

Alternatively, as illustrated in FIG. 6, optimal optical alignment of the photonics assembly may be maintained by receiving the divergent energy of the optical signal 52 at a photodetector, optical fiber, beam splitter, or similar device. A photodetector 61 detects the divergent energy 59 of the optical signal 52. The photodetector 61, is electrically connected to the sensing element 62 which detects the divergent energy 59 of the optical signal 52. The divergent energy 59 is compared against a predetermined level of divergence expected for the signal 52 during optimal signal alignment of the fiber core 54. Based on the results of the comparison the electrical status signal 64 is sent to the controller element 66 which actuates the flexing movements of the microactuators 74, 76, and 78 in the manner previously described.

Figure 4:
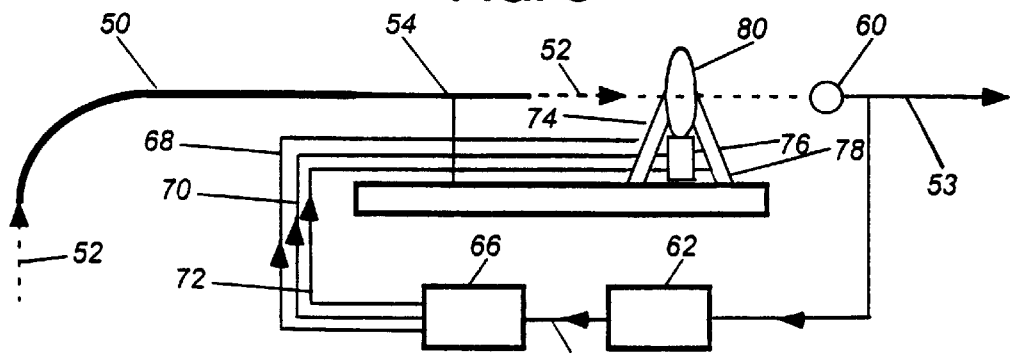
FIG. 4 is an illustration of an alternate embodiment of the active alignment photonics assembly illustrated in FIG. 3.
Figure 5:
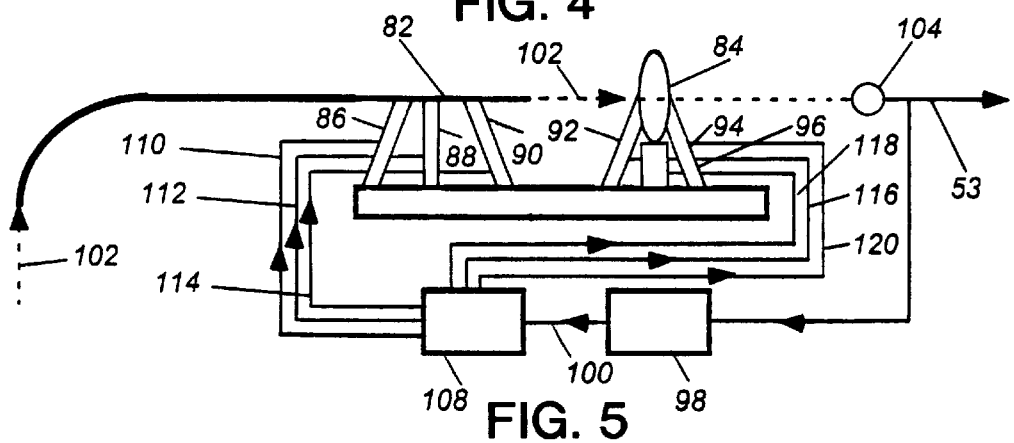
FIG. 5 is an illustration of a further alternate embodiment of a active alignment photonics assembly in accordance with the present invention.

It should be understood by those of ordinary skill in the art that the principles of the present invention are applicable to many types of photonics assemblies, such as those illustrated in FIGS. 4 and 5. As shown in FIG. 4, a lens 80 is adjusted in a manner similar to that used to adjust the fiber core 54 of FIG. 3. The lens 80, as contrasted to the fiber core 54 illustrated in FIG. 3, is adjusted by the "flexing" motion of microactuators 74, 76, and 78 and an optical signal 52 is optimally focused onto a photodector 60. The "flexing" motion of microactuators 74, 76, and 78 may reorient the lens 80, or change the optical properties by lens deformation. Alternatively, the lens 80 may be substituted for by a mirror, diffraction element, interference element, waveguide or similar optical coupling device.

Further, as illustrated in FIG. 5, both the fiber core 82 and lens 84 may be adjusted by means of microactuators 86, 88, 90, 92, 94, and 96 respectively. A sensing element 98 generates a status signal 100 based on the power of an optical signal 102 at the photodiode detector 104 and sends the status signal 100 to a controller element 108. The controller element 108 determines the adjustment required at the fiber core 82 and the lens 84 and electrical correction signals 110, 112, and 114 are generated to flex microactuators 86, 88, and 90 respectively; and electrical signals 116, 118, and 120 are generated to flex microactuators 92, 94, and 96 respectively. The assembly illustrated in FIG. 5 allows for simultaneous adjustment of distinct optical elements and therefore provides additional control of the alignment of the fiber 82 relative to the photodiode detector 104.

Obviously, many modifications and variations of the present invention are possible in light of the above teachings. Thus, it is to be understood that, within the scope of the appended claims, the invention may be practiced otherwise than as specifically described above.

What is claimed is:

1. An active alignment photonics assembly, comprising:
   a fiber optic element for carrying an optical signal;
   a first optical element spaced from said fiber optic element, said first optical element having an input for accepting said optical signal;
   a second optical element disposed in an optical signal path between said fiber optic element and said first optical element for focusing said optical signal;
   a sensing element for determining the power of said optical signal at said first optical element and generating a status signal in response thereto;
   a controller element for receiving said status signal and distributing a correction signal; and
   an aligning element connected to said fiber optic element and said second optical element, said aligning element receiving said correction signal and simultaneously adjusting said fiber optic element and said second optical element in response to said correction signal, thereby adjusting the path of said optical signal.

2. An active alignment photonics assembly as recited in claim 1, wherein said first optical element is selected from the group consisting of photodiode detector, optical fiber, modulator, filter, and waveguide.

3. An active alignment photonics assembly as recited in claim 1, wherein said first optical element, said second optical element, said sensing element, said controller and said aligning means form a monolithic body.

4. An active alignment photonics assembly as recited in claim 1, wherein said aligning element comprises a first servo-mechanism controlled microactuator connected to said fiber optic element and a second servomechanism controlled microactuator connected to said second optical element.

5. An active alignment photonics assembly as recited in claim 4, wherein said first and second microactuators are selected from the group consisting of bimetal strips, piezoelectrics, heated elements, and electrical movable elements.

6. An active alignment photonics assembly as recited in claim 4, wherein said first and second microactuators are selected from the group consisting of motors, levers, and stepper motors.

7. An active alignment photonics assembly as recited in claim 4, wherein said first microactuator is arranged to adjust said fiber optic element in three dimensions whereby said optical signal is optimized relative to said first optical element input.

8. An active alignment photonics assembly as recited in claim 4, wherein said second microactuator is arranged to adjust said second optical element in three dimensions whereby said optical signal is optimized relative to said first optical element input.

9. An active alignment photonics assembly as recited in claim 1, wherein said second optical element is selected from the group consisting of lens, diffraction elements, interference elements, waveguides, and mirrors.

10. An active alignment photonics assembly as recited in claim 1, wherein said fiber optic element comprises a fiber optic cable having a fiber core.

11. An active alignment photonics assembly, comprising:
    a fiber optic element for carrying an optical signal;
    a first optical element spaced from said fiber optic element, said first optical element having an input for accepting said optical signal;
    a second optical element spaced from said fiber optic element, said second optical element having an input for accepting divergent power of said optical signal;
    a third optical element disposed in an optical signal path between said fiber optic element and said first optical element for focusing said optical signal; a sensing element for determining said divergent power of said optical signal at said second optical element and generating a status signal in response thereto;
    a controller element for receiving said status signal and distributing a correction signal; and
    an aligning element connected to said fiber optic element and said third optical element, said aligning element receiving said correction signal and simultaneously adjusting said fiber optic element and said third optical element in response thereto, thereby adjusting the path of said optical signal.

12. An active alignment photonics assembly as recited in claim 11, wherein said first optical element is selected from the group consisting of photodiode detector, optical fiber, modulator, filter, and waveguide.

13. An active alignment photonics assembly as recited in claim 11, wherein said first optical element, said third optical element said sensing element, said controller and said aligning means form a monolithic body.

14. An active alignment photonics assembly as recited in claim 11, wherein said second optical element is selected from the group consisting of photodiode detectors, optical fibers, and beam splitters.

15. An active alignment photonics assembly as recited in claim 11, wherein said aligning element comprises a first servo-mechanism controlled microactuator attached to said fiber optic element and a second servomechanism controlled microactuator attached to said third optical element.

16. An active alignment photonics assembly as recited in claim 11, wherein said third optical element is selected from the group consisting of lens, diffraction elements, interference elements, waveguides, and mirrors.

17. An active alignment photonics assembly as recited in claim 11, wherein said fiber optic element comprises a fiber optical cable having a fiber core.

18. An active alignment photonics assembly as recited in claim 15, wherein said first and second microactuators are selected from the group consisting of bimetal strips, piezoelectrics, heated elements, and electrical movable elements.

19. An active alignment photonics assembly as recited in claim 15, wherein said first microactuator and said second microactuator are selected from the group consisting of motors, levers, and stepper motors.

20. An active aligment photonics assembly as recited in claim 15, wherein said first microactuator is arranged to adjust said fiber optic element in three dimensions whereby said optical signal is optimized relative to said first optical element input.

21. An active alignment photonics assembly as recited in claim 15, wherein said second microactuator is arranged to adjust said third optical element in three dimensions whereby said optical signal is optimized relative to said first optical element input.

* * * * *